Jan. 6, 1953  O. BABST  2,624,204
MECHANICAL MOVEMENT
Filed June 22, 1950  2 SHEETS—SHEET 1

Inventor:
OTTO BABST
By Wundroth, Lind & Ponack
ATTORNEYS

Patented Jan. 6, 1953

2,624,204

UNITED STATES PATENT OFFICE 2,624,204

MECHANICAL MOVEMENT

Otto Babst, Berlin-Haselhorst, Germany, assignor to Rotaprint Akt. Ges., Berlin, Germany, a company of Germany Application June 22, 1950, Serial No. 169,546
In Germany December 31, 1948

8 Claims. (Cl. 74—42)

The invention relates to a pivot gearing, especially for printing and manifolding machines, with a driving crank and a rocking lever which forms the drive and the movements of which are controlled by a three-pivot coupling member and associated pivoted members. The periodic movements of the rocking lever are used for the purpose of controlling machines or machine parts for different purposes, such as manifolding, sorting masses of printed matter etc.

Such pivot gearings are already known for the production of periodic movements, but they have hitherto failed on being tried with high speeds of the drive, since, with high speeds of the drive, they tend to carry out self-oscillation and, consequently, run very unsteadily.

The invention provides a pivot gearing, the pivoted members and rocking lever of which are pivoted to the coupling member or vice versa in such a manner that the motive forces act in the zone of the medial plane of the coupling member or of the pivoted members. In this way, the result is obtained that the pivot pins and also the members are substantially not strained to bending, so that the tendency of the pivot gearing to self-oscillation is very greatly reduced and, at the same time, a saving in material is obtained because the pivoted members and the coupling member can be made in considerably smaller dimensions. According to the invention, the coupling member, to which the rocking lever or the pivoted members is or are coupled, is formed of two plates which are spaced apart by the pivot pins of the coupling member. Advantageously, the plates of the coupling member serve, at the same time, for guiding the journal bearings of the pivoted members or of the rocking lever and themselves. According to a further feature of the invention, the pivotability of the gearing on the driving side is increased by virtue of the fact that, on the driving side, a pivoted pentagon and, on the driven side, a pivoted square are formed by the coupling member and its appurtenant pivoted members. According to the invention, the three-pivot coupling member is, moreover, coupled directly with the rocking lever on the driven side and, through a pivoted member, with the driving crank, whilst the third pivot of the coupling member is connected, through a pivoted member, with a special stationary pivot of the frame of the gearing.

An example of embodiment is described with the aid of the accompanying drawings. The pivot gearing according to the invention is described with reference to the sucker-rod control of a manifolding machine.

Figure 1:
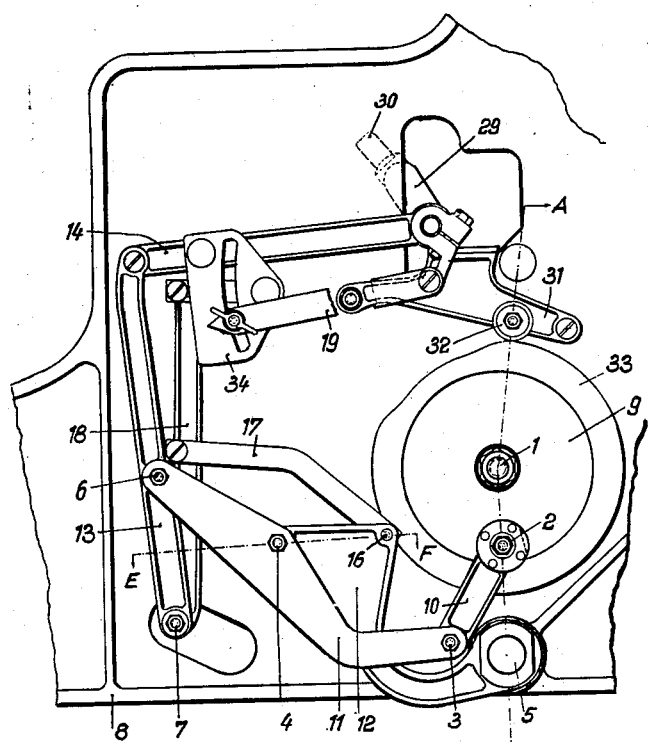
Fig. 1 is a plan of the pivot gearing according to the invention for the control of the sucker rod.

The pivot gearing according to the invention has three stationary pivots 1, 5 and 7 on the frame 8 of the stand of the machine (Fig. 1). Connected to the pivot 2 of the crank plate 9 is the two-pivot crank rod 10, from the second pivot 3 of which the three-pivot coupling member 11 is driven. Coupled to the stationary pivots 5 and 7 of the stand of the machine are respectively the pivoted member 12 and the rocking lever 13 on the driven side, the latter being the driven member of the six-member seven-pivot chain. The driven rocking lever 13 is directly connected with the three-pivot coupling member 11, the middle pivot 4 of which, that lies substantially on a straight line between the pivots 3 and 6 (respectively on the driving side and driven side) of the coupling member 11, is connected with the pivoted member 12 that is stationarily pivoted to the frame 8 of the machine. The pivot gearing according to the invention forms, as aforesaid, with the pivots 1, 2, 3, 4 and 5, a pivoted pentagon on the driving side, whilst a pivoted square is formed on the driven side with the pivots 4, 5, 7 and 6. The increase of the pivotability of the pivot gearing on the driving side produces the steady running of the pivot gearing even at high speeds.

Figure 3:
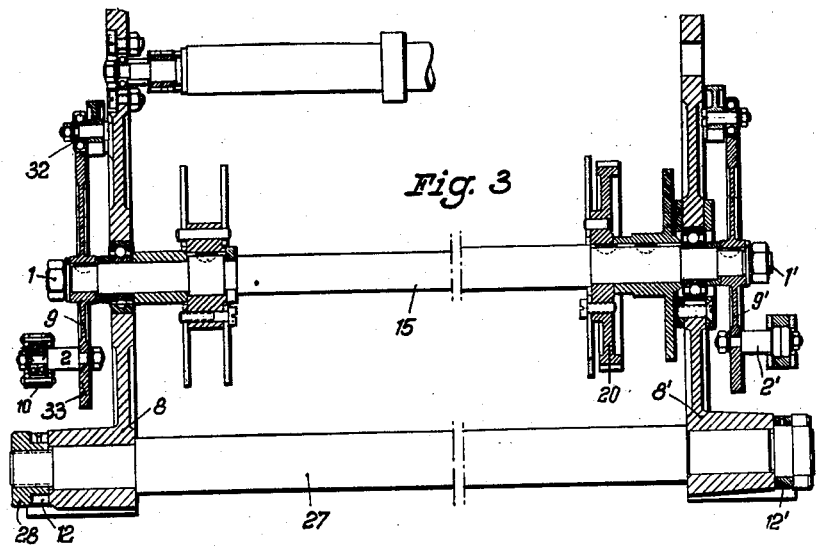
Fig. 3 is a section on the line A—B of Fig. 1 showing the pivot gearings arranged on the two sides of the sucker rod.
Figure 4:
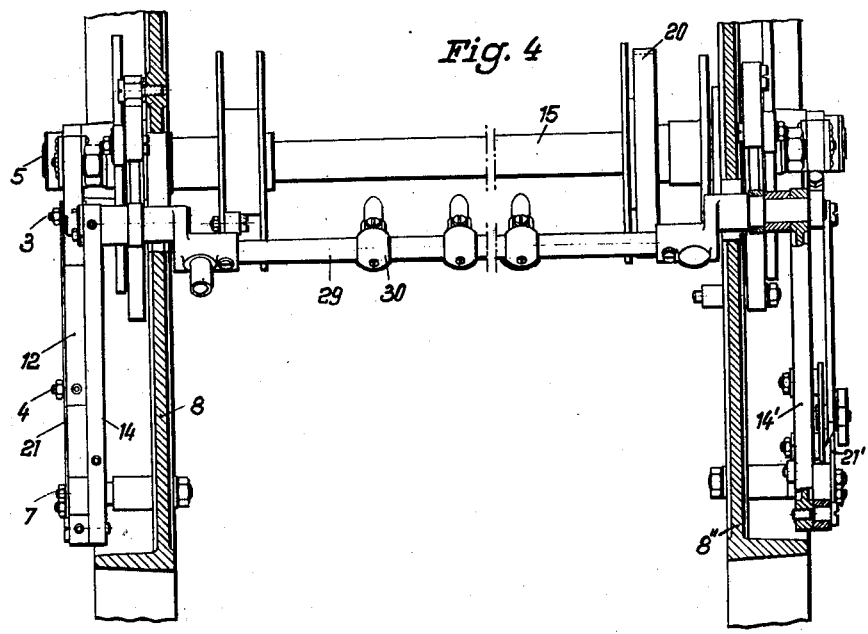
Fig. 4 is a top plan of Fig. 3.

The pivot gearing is driven by a driving shaft 15, the rotation of which is derived from the main drive of the manifolding machine through a gear wheel 20 (Figs. 3 and 4). A crank plate 9 is mounted on the end of the driving shaft 15 that projects beyond the frame 8 of the stand of the machine. Fixed to the crank plate 9 is a pin 2 on which the pivoted member 10 is arranged rotatably in ball-bearings. As stated, the pivoted member 10 is connected, through the pivot 3, with the three-pivot coupling member 11.

The coupling member 11, the three pivots of which lie substantially in a straight line, is long in relation to the pivoted member 10. Its length corresponds approximately to the distance between the stationary pivots 1 and 7. In view of the fact that the pivoted member 10 on the driving side is short in relation to the coupling member 11 connected directly with the rocking lever 13, the result is obtained that the centre of gravity of the pivoted member 10 runs through fairly equal distances in the same times and, in this way, a steady running of the articulated chain on the driving side is also produced.

According to the invention, the coupling member 11 consists of two plates 21 and 22 (Figs. 2 and 4) which are kept spaced apart by the pins of the pivots 3, 4 and 6 of the coupling member. As can be seen from Fig. 2, the pivot pins are in the form of a screw 23 and a screw bolt 24 on which a sleeve 25 is mounted, about which the journal bearing 26 of the pivoted member 12 swings. The pivots 3, 4 and 6 of the coupling member are formed in the same manner. It is also to be seen that the journal bearings of the pivoted member are guided between the plates 21 and 22. Owing to this construction of the coupling member, the result is obtained that the motive forces of the pivoted members or of the coupling member act in the zone of the medial plane of the coupling member and, in this way, bending moments at the pivot pin are avoided. The tendency of the pivot gearing to self-oscillation is considerably reduced or eliminated even at very high working speeds of the gearing. In addition, the elongated coupling member may be made in very considerably smaller dimensions; this is to be regarded as a very great advantage. It is obvious that the pivoted members may be constructed similarly to the coupling member.

The pivot pin of the stationary pivot 5 is formed on the parts of a cross-bar 27 which project beyond the frame 8 of the machine stand, which cross-bar 27 holds together the frames 8 and 8' of the machine stand, which lie at the two ends respectively of the sucker rod 29, by means of the screw member 28 on which the pivoted member 12 is rockably arranged (Figs. 3 and 4). Coupled with the pivoted member 12 is a further pivoted member 17 on a pivot 16 which projects from the medial plane of the member 12 and which operates a second rocking lever 18 on the driven side.

Figure 2:
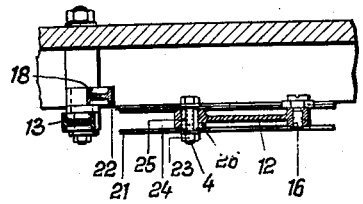
Fig. 2 is a section on the line E—F of Fig. 1.

The rocking levers 13 and 18 on the driven side rock about a stationary pivot pin 7 which is fixed to the frame 8 of the machine stand by screws (Figs. 1 and 2). As can be seen from Fig. 2, the two rocking levers 13 and 18 are arranged next to each other on the pivot pin 7. The rocking levers 13 and 18 serve for controlling the sucker rod 29 on which the suckers 30 for sucking up a sheet from the pile of paper are arranged in the known manner.

Pivoted to the rocking lever 13 is a rod 14 on which the sucker rod 29 is mounted which can, in this way, be periodically moved to and fro, whilst a rod 19 is connected pivotally with the rocking lever 18 through a shifting device 34 which periodically effects a tilting of the sucker rod 29 for the purpose of separating the top sheet from the pile of paper. For lifting and lowering the sucking rod 29 there is employed a special lever 31 with a wheel 32 which slides on a cam plate 33 which is arranged on the crank plate 9a that serves for driving the pivot gearing.

As can be seen from Figs. 3 and 4, the pivot gearing according to the invention is arranged on the two sides of the sucker rod 29 or of the driving shaft 15. The corresponding parts are, as far as this is concerned, provided with corresponding reference numerals and leading lines.

What I claim is:

1. A pivot gearing for printing and manifolding machines, comprising a driving crank, a drive-forming rocking lever, a three-pivot coupling member and associated pivoted members to control the movements of said rocking lever and a stationary pivot on the frame of said gearing, said coupling member being coupled directly with said rocking lever on the driven side and, through one of said pivoted members, with said driving crank, the third pivot of said coupling member being connected, through a second of said pivoted members, with said stationary pivot and said pivoted members and said rocking lever being pivotally connected with said coupling member to cause the motive forces to act in the zone of the medial plane of said coupling member or of said pivoted members.

2. A pivot gearing for printing and manifolding machines, comprising a driving crank, a drive-forming rocking lever, a three-pivot coupling member and associated pivoted members to control the movements of said rocking lever and a stationary pivot on the frame of said gearing, said coupling member being formed of two plates spaced apart by pins of the pivots of said coupling member, said pivoted members and said rocking lever being coupled with said pins, said coupling member being coupled directly with said rocking lever on the driven side and, through one of said pivoted members, with said driving crank, the third pivot of said coupling member being connected, through a second of said pivoted members, with said stationary pivot.

3. A pivot gearing for printing and manifolding machines, comprising a driving crank, a drive-forming rocking lever, a three-pivot coupling member and associated pivoted members to control the movements of said rocking lever and a stationary pivot on the frame of said gearing, said coupling member being formed of two plates spaced apart by pins of the pivots of said coupling member, said pivoted members and said rocking lever being coupled with said pins, journal bearings for said pivoted members being guided between said plates, said coupling member being coupled directly with said rocking lever on the driven side and, through one of said pivoted members, with said driving crank, the third pivot of said coupling member being connected, through a second of said pivoted members, with said stationary pivot.

4. A pivot gearing for printing and manifolding machines, comprising a driving crank, a drive-forming rocking lever, a three-pivot coupling member and associated pivoted members to control the movements of said rocking lever, the pivots of said coupling member lying substantially in a straight line, and a stationary pivot on the frame of said gearing, said coupling member being coupled directly with said rocking lever on the driven side and, through one of said pivoted members, with said driving crank, the third pivot of said coupling member being connected, through a second of said pivoted members, with said stationary pivot and said pivoted members and said rocking lever being pivotally connected with said coupling member to cause the motive forces to act in the zone of the medial plane of said coupling member or of said pivoted members.

5. A pivot gearing for printing and manifolding machines, comprising a driving crank, a drive-forming rocking lever, a three-pivot coupling member and associated pivoted members to control the movements of said rocking lever, the pivots of said coupling member lying substantially in a straight line, and a stationary pivot on the frame of said gearing, said coupling member being formed of two plates spaced apart by pins of the pivots of said coupling member, said pivoted members and said rocking lever being coupled with said pins, said coupling member being coupled directly with said rocking lever on the driven side and, through one of said pivoted members, with said driving crank, the third pivot of said coupling member being connected, through a second of said pivoted members, with said stationary pivot.

6. A pivot gearing for printing and manifolding machines, comprising a driving crank, a drive-forming rocking lever, a three-pivot coupling member and associated pivoted members to control the movements of said rocking lever, the pivots of said coupling member lying substantially in a straight line, and a stationary pivot on the frame of said gearing, said coupling member being formed of two plates spaced apart by pins of the pivots of said coupling member, said pivoted members and said rocking lever being coupled with said pins, journal bearings for said pivoted members guided between said plates, said coupling member being coupled directly with said rocking lever on the driven side and, through one of said pivoted members, with said driving crank, the third pivot of said coupling member being connected, through a second of said pivoted members, with said stationary pivot, and said pivoted members and said rocking lever being pivotally connected with said coupling member to cause the motive forces to act in the zone of the medial plane of said coupling member or of said pivoted members.

7. A pivot gearing for printing and manifolding machines having suckers, comprising a driving crank, a drive-forming rocking lever, a three-pivot coupling member and associated pivoted members to control the movements of said rocking lever, a rocking lever for tilting the suckers, the pivots of said coupling member lying substantially in a straight line, a stationary pivot on the frame of said gearing, a further pivoted member, a second rocking lever for tilting the suckers, said coupling member being coupled directly with said rocking lever on the driven side and, through one of said pivoted members, with said driving crank, the third pivot of said coupling member being connected, through a second of said pivoted members, with said stationary pivot, another of the first mentioned pivoted members and the middle pivot of said coupling member being coupled with said second rocking lever through said further pivoted member and the first mentioned pivoted members and the first mentioned rocking lever being pivotally connected with said coupling member to cause the motive forces to act in the zone of the medial plane of said coupling member or of the first mentioned pivoted members.

8. A pivot gearing for printing and manifolding machines having suckers, comprising a driving crank, a drive-forming rocking lever, a three-pivot coupling member and associated pivoted members to control the movements of said rocking lever, a rocking lever for tilting the suckers, the pivots of said coupling member lying substantially in a straight line, a stationary pivot on the frame of said gearing, a further pivoted member, a second rocking lever for tilting the suckers, said coupling member being formed of two plates spaced apart by pins of the pivots of said coupling member, said pivoted members and said rocking lever being coupled with said pins, journal bearings for said pivoted members guided between said plates, said coupling member being coupled directly with said rocking lever on the driven side and, through one of said pivoted members, with said driving crank, the third pivot of said coupling member being connected, through a second of said pivoted members, with said stationary pivot, and another of the first mentioned pivoted members and the middle pivot of said coupling member being coupled with said second rocking lever through said further pivoted member.

OTTO BABST.

REFERENCES CITED

The following references are of record in the file of this patent:

UNITED STATES PATENTS

| Number | Name | Date |
| --- | --- | --- |
| 184,761 | Corey | Nov. 28, 1876 |
| 217,858 | Burke | July 29, 1879 |
| 2,305,128 | Andresen et al. | Dec. 15, 1942 |
| 2,509,842 | Rossman | May 30, 1950 |